(12) United States Patent
Peng et al.

(10) Patent No.: US 11,784,572 B2
(45) Date of Patent: Oct. 10, 2023

(54) CONVERSION CIRCUIT AND ADAPTER

(71) Applicant: Huawei Digital Power Technologies Co., Ltd., Shenzhen (CN)

(72) Inventors: Xingqiang Peng, Dongguan (CN); Sai He, Dongguan (CN); Jingbo Xiao, Dongguan (CN); Shaoqing Dong, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/873,446

(22) Filed: Jul. 26, 2022

(65) Prior Publication Data

US 2023/0038641 A1 Feb. 9, 2023

(30) Foreign Application Priority Data

Aug. 6, 2021 (CN) .......................... 202110904168.5

(51) Int. Cl.
*H02M 1/08* (2006.01)
*H02M 3/335* (2006.01)

(52) U.S. Cl.
CPC ......... *H02M 3/33569* (2013.01); *H02M 1/08* (2013.01)

(58) Field of Classification Search
CPC ....................................................... H02M 1/08
USPC ............................................................ 327/67
See application file for complete search history.

(56) References Cited

U.S. PATENT DOCUMENTS

| 2005/0285661 A1 | 12/2005 | Wittenbreder, Jr. |
| 2006/0146584 A1 | 7/2006 | Aso et al. |
| 2020/0007041 A1* | 1/2020 | Liu ................... H02M 3/33507 |

FOREIGN PATENT DOCUMENTS

CN 107196517 A 9/2017

* cited by examiner

*Primary Examiner* — Tomi Skibinski
(74) *Attorney, Agent, or Firm* — Maier & Maier, PLLC

(57) ABSTRACT

A conversion circuit and an adapter that resolve a voltage drop problem of a power supply of a driver in an ACF circuit. The conversion circuit includes an active clamp flyback circuit, a drive circuit, and a replenishment power transistor. The active clamp flyback circuit is configured to perform power conversion. The drive circuit is configured to output a drive signal and a reference voltage. The drive signal is used to drive the active clamp flyback circuit. A first terminal of the replenishment power transistor is coupled to an input terminal of the active clamp flyback circuit, a second terminal of the replenishment power transistor is coupled to a power supply terminal of the drive circuit, and a gate of the replenishment power transistor is configured to receive the reference voltage.

10 Claims, 5 Drawing Sheets

CONVERSION CIRCUIT AND ADAPTER

CROSS-REFERENCE TO RELATED APPLICATION

This application claims priority to Chinese Patent Application No. 202110904168.5, filed on Aug. 6, 2021, which is hereby incorporated by reference in its entirety.

TECHNICAL FIELD

The embodiments relate to the field of chip technologies, a conversion circuit, and an adapter.

BACKGROUND

In an adapter, a rectifier bridge and an active clamp flyback (ACF) circuit are usually used to implement alternating current (AC)/direct current (DC) conversion. The rectifier bridge is configured to implement full-wave rectification, and the ACF circuit is configured to convert an output current of the rectifier bridge into a direct current.

In the conventional technology, an architecture and a drive solution of the ACF circuit may be shown in FIG. 1 (FIG. 1 shows only a driver of a high-side power transistor QH and does not show a driver of a low-side power transistor QL). The ACF circuit includes the high-side power transistor QH, the low-side power transistor QL, a clamp capacitor Cc, a transformer T, a diode D1, and a load capacitor Co. A controller outputs a PWM signal to the driver to control conduction and cutoff of the high-side transistor or the low-side transistor, to implement voltage conversion from input to output.

A source of the high-side power transistor QH is connected to a floating ground SW. To completely conduct the high-side power transistor QH, a voltage of a power supply VB of the driver needs to be higher than a voltage of SW. Only in this way, the driver can output a voltage higher than the voltage of SW to a gate of the high-side power transistor QH, to completely conduct the high-side power transistor QH. In the conventional technology, this is usually implemented by using a bootstrap capacitor technology: When the low-side power transistor QL conducts, a bootstrap capacitor $C_B$ is fully charged by using VDD. When the low-side power transistor QL is cut off and the voltage of SW rises, the voltage of VB can reach SW+VDD, that is, the voltage of VB is higher than the voltage of SW.

A disadvantage of using the bootstrap capacitor is as follows: A capacitor charge of $C_B$ is continuously consumed in an operating process of the driver, but $C_B$ can be replenished with power only when the low-side power transistor QL conducts and SW is pulled to a ground. Therefore, if the low-side power transistor QL is in a cutoff state for too long time, the voltage of VB drops. Consequently, VB−SW decreases, and the driver enters an under-voltage state. In the under-voltage state, when the high-side power transistor QH needs to be turned on, it is difficult for the driver in the under-voltage state to conduct the high-side power transistor QH.

To resolve a voltage drop problem of the power supply of the driver of the high-side power transistor QH, in the conventional technology, a capacitance of the bootstrap capacitor is usually increased, or static power consumption of the driver is usually reduced. However, the two solutions can only slow down a voltage drop and cannot completely resolve the voltage drop problem.

Therefore, a solution for resolving a voltage drop problem of a power supply of a driver in an ACF circuit is urgently needed.

SUMMARY

The embodiments provide a conversion circuit and an adapter, to resolve a voltage drop problem of a power supply of a driver in an ACF circuit.

According to a first aspect, an embodiment may provide a conversion circuit. The conversion circuit includes an active clamp flyback circuit, a drive circuit, and a replenishment power transistor. The active clamp flyback circuit is configured to perform power conversion. The drive circuit is configured to output a reference voltage and a drive signal for driving the active clamp flyback circuit. A first terminal of the replenishment power transistor is coupled to an input terminal of the active clamp flyback circuit, a second terminal of the replenishment power transistor is coupled to a power supply terminal of the drive circuit, and a gate of the replenishment power transistor is configured to receive the reference voltage.

The first terminal of the replenishment power transistor may be a drain of the replenishment power transistor, and the second terminal of the replenishment power transistor may be a source of the replenishment power transistor.

The replenishment power transistor is additionally disposed in the conversion circuit provided in the first aspect. The gate of the replenishment power transistor is configured to receive the reference voltage output by the drive circuit, and the source of the replenishment power transistor is coupled to the power supply terminal of the drive circuit. In this way, according to a conduction characteristic of the replenishment power transistor, the replenishment power transistor can conduct when a difference between the reference voltage and a voltage of the power supply terminal of the drive circuit is greater than a voltage threshold (VTH). After the replenishment power transistor conducts, the input terminal of the active clamp flyback circuit is coupled to the power supply terminal of the drive circuit. In this way, the drive circuit can be replenished with power by using the input terminal of the active clamp flyback circuit, to resolve a voltage drop problem of the drive circuit.

The input terminal of the active clamp flyback circuit is bridged with a clamp capacitor, the first terminal of the replenishment power transistor is coupled to the clamp capacitor, and the replenishment power transistor conducts when the difference between the reference voltage and the voltage of the power supply terminal of the drive circuit is greater than the voltage threshold.

In the solution, the drive circuit is coupled to the clamp capacitor by using the replenishment power transistor.

The drive circuit may include a driver and a replenishment circuit. The driver is configured to generate the drive signal based on an input control signal, where the drive signal is used to drive a first power transistor in the active clamp flyback circuit to conduct or be cut off. A power supply terminal of the driver is coupled to the second terminal of the replenishment power transistor, and a ground terminal of the driver is coupled to a source of the first power transistor. The replenishment circuit includes a diode and a bootstrap capacitor, an anode of the diode is coupled to a replenishment power supply, a cathode of the diode is coupled to a first terminal of the bootstrap capacitor and the power supply terminal of the drive circuit, and a second terminal of the bootstrap capacitor is coupled to the ground terminal of the driver.

In the solution, the drive circuit can be replenished with power by using the replenishment circuit.

The replenishment power transistor is a depleted power transistor, and a voltage value of the reference voltage is less than a voltage value of the power supply terminal of the drive circuit.

In the solution, because a conduction threshold voltage of the depleted power transistor is a negative value, the depleted power transistor can conduct only when a difference between a gate voltage and a source voltage of the depleted power transistor reaches the negative threshold, that is, the gate voltage is less than the source voltage when the depletion power transistor conducts. In this way, for the drive circuit, the replenishment power transistor can conduct only when the voltage value of the reference voltage output by the drive circuit is less than the voltage value of the power supply terminal of the drive circuit. Therefore, the drive circuit needs to output only a reference voltage less than a power supply voltage of the drive circuit. In this case, it is unnecessary to add a reference voltage generation module to the drive circuit, and it is only necessary to output a reference voltage from a node inside the drive circuit.

The replenishment power transistor is an enhanced power transistor, and a voltage value of the reference voltage is greater than a voltage value of the power supply terminal of the drive circuit.

In the solution, because a conduction threshold voltage of the enhanced power transistor is a positive value, the enhanced power transistor can conduct only when a difference between a gate voltage and a source voltage of the enhanced power transistor reaches the positive threshold, that is, the gate voltage needs to be greater than the source voltage when the enhanced power transistor conducts. In this way, for the drive circuit, the replenishment power transistor can conduct only when the voltage value of the reference voltage output by the drive circuit is greater than the voltage value of the power supply terminal of the drive circuit. Therefore, the drive circuit needs to output a reference voltage greater than a power supply voltage of the drive circuit. In this case, a reference voltage generation module needs to be added to the drive circuit.

For example, the drive circuit further includes a charge pump, and the charge pump is configured to generate the reference voltage.

The active clamp flyback circuit may include: the clamp capacitor; the first power transistor, where a drain of the first power transistor is coupled to the clamp capacitor, and the source of the first power transistor is coupled to a ground terminal of the drive circuit, a gate of the first power transistor is coupled to an output terminal of the drive circuit; a second power transistor, where a drain of the second power transistor is coupled to the source of the first power transistor, and a source of the second power transistor is coupled to a ground; a transformer, where the transformer includes a primary coil and a secondary coil, two terminals of the primary coil are respectively coupled to the clamp capacitor and the source of the first power transistor, two terminals of the secondary coil are respectively connected to an anode of an output diode and a load capacitor; the output diode, where a cathode of the output diode is coupled to the load capacitor; and the load capacitor, where two terminals of the load capacitor are configured to output a direct current.

A structure of an active clamp flyback circuit in the conventional technology may also be applicable to this embodiment.

The first power transistor is an enhanced power transistor, and the first power transistor and the replenishment power transistor are integrated on a same substrate.

According to a second aspect, an embodiment may provide an adapter. The adapter includes a rectifier circuit and the conversion circuit provided in any one of the first aspect and the possible designs of the first aspect. The rectifier circuit is configured to rectify an input alternating current, to obtain an output current. The conversion circuit is configured to convert the output current into a direct current.

In addition, it should be understood that, for an effect brought by the second aspect, refer to effects brought by the first aspect. Details are not described herein again.

DETAILED DESCRIPTION OF THE EMBODIMENTS

The following further describes in detail the embodiments with reference to accompanying drawings.

It should be noted that in the embodiments, "a plurality or" means two or more. In addition, in descriptions, terms such as "first" and "second" are merely used for differentiation and description but should not be understood as an indication or implication of relative importance or an indication or implication of an order. In the embodiments, "coupling" indicates an electrical connection, and may include two manners: a direct connection or an indirect connection.

Figure 1:
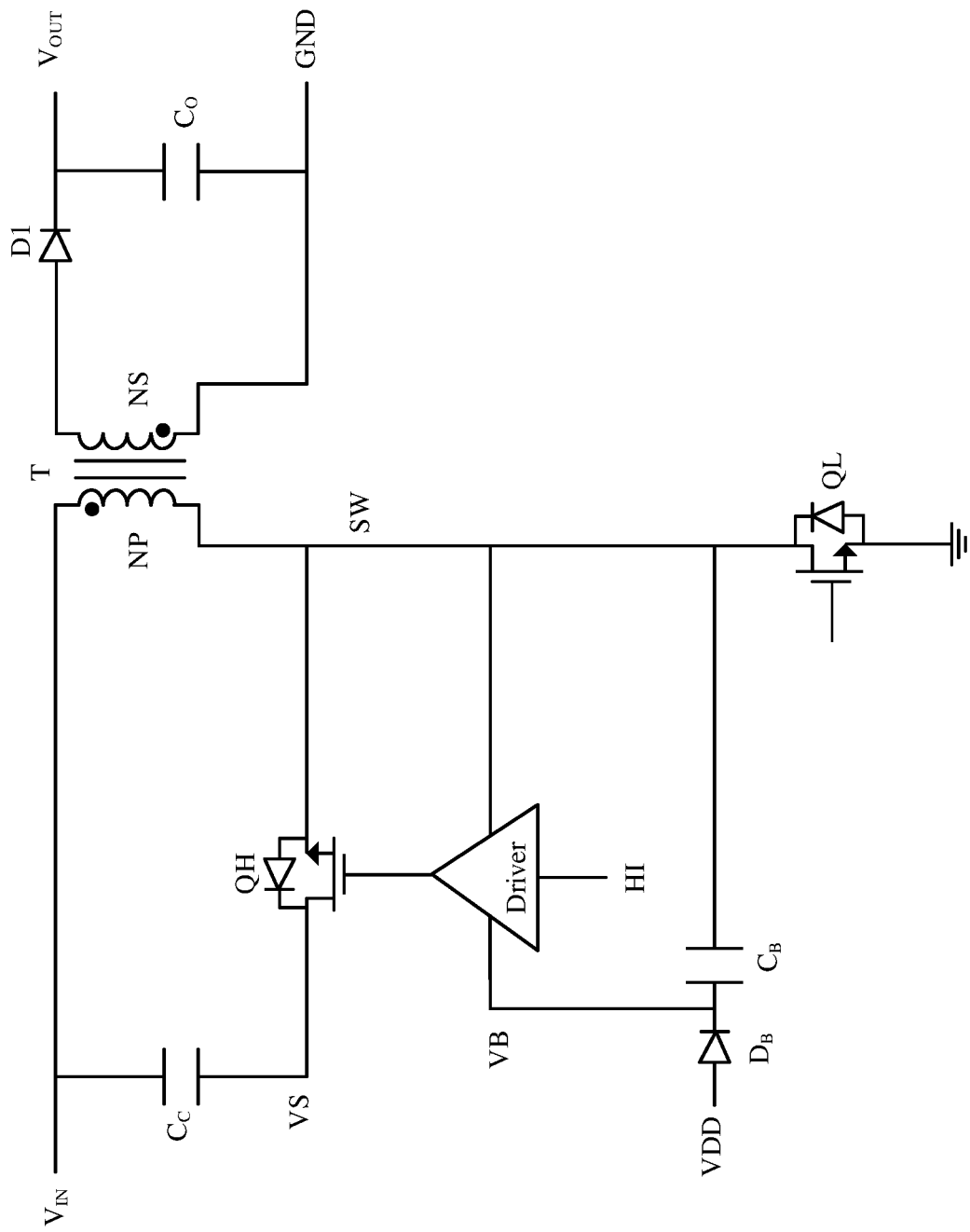
FIG. 1 is a schematic diagram of a structure of an ACF circuit according to the conventional technology.
Figure 2:
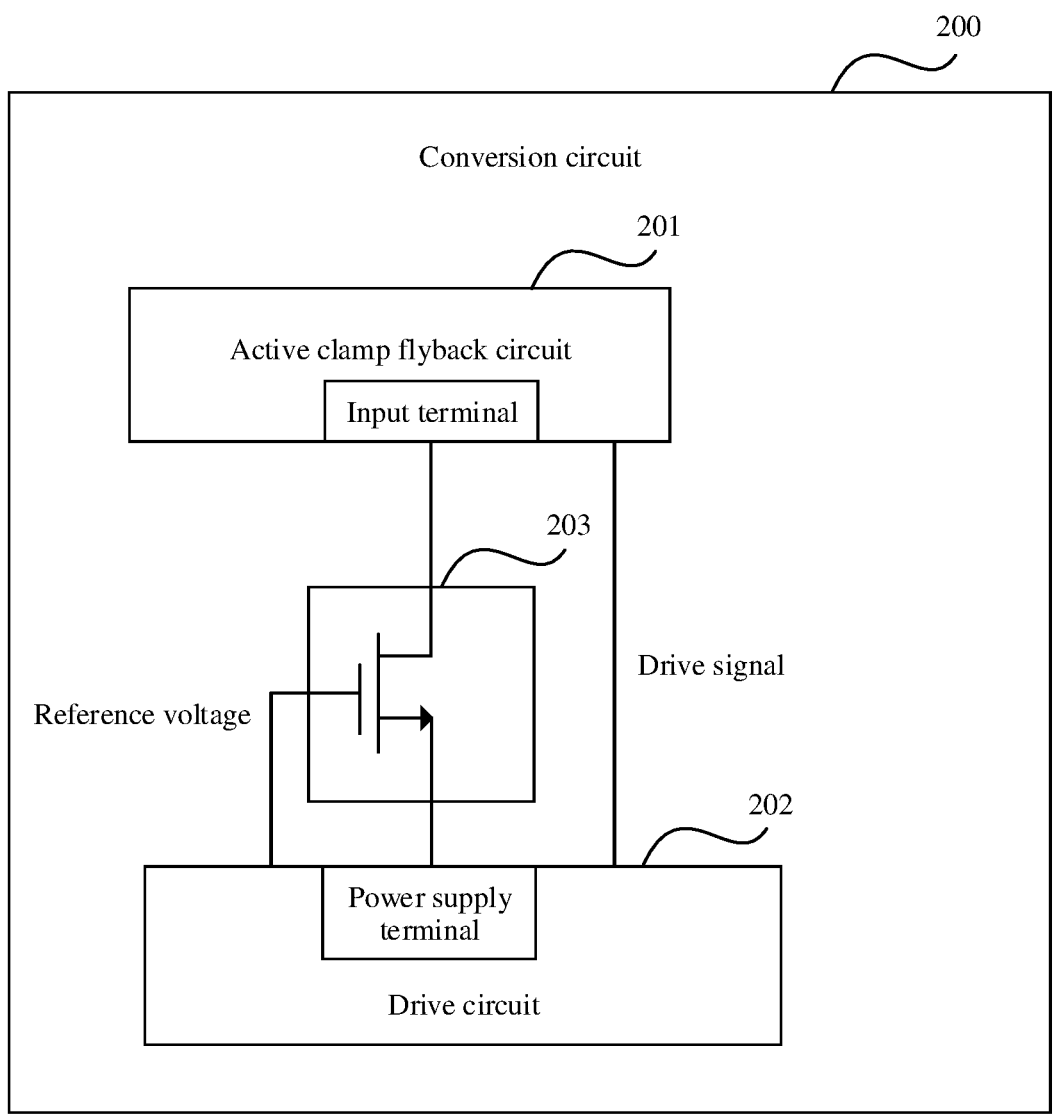
FIG. 2 is a schematic diagram of a structure of a first conversion circuit according to an embodiment.

An embodiment may provide a conversion circuit. Referring to FIG. 2, a conversion circuit 200 includes an active clamp flyback circuit 201, a drive circuit 202, and a replenishment power transistor 203. The active clamp flyback circuit 201 is configured to perform power conversion. The drive circuit 202 is configured to output a drive signal and a reference voltage, where the drive signal is used to drive the active clamp flyback circuit 201. A first terminal of the replenishment power transistor 203 is coupled to an input terminal of the active clamp flyback circuit 201, a second terminal of the replenishment power transistor 203 is coupled to a power supply terminal of the drive circuit 202, and a gate of the replenishment power transistor 203 is configured to receive the reference voltage.

The active clamp flyback circuit 201 is configured to implement power conversion. The power conversion means that a type of current is converted into another type of current, for example, an alternating current is converted into a direct current. In this embodiment, the active clamp flyback circuit 200 may be configured to convert, into a direct current, an output current obtained after a rectifier bridge rectifies an alternating current.

The first terminal of the replenishment power transistor 203 may be a drain of the replenishment power transistor 203, and the second terminal of the replenishment power transistor 203 may be a source of the replenishment power transistor 203.

In actual application, the power transistor in this embodiment may be, for example, a metal-oxide-semiconductor field-effect transistor (MOSFET), a gallium nitride (GaN) transistor, an insulated gate bipolar transistor (IGBT), or a bipolar junction transistor (BJT).

In this embodiment, the replenishment power transistor 203 is additionally disposed in the conversion circuit 200. The gate of the replenishment power transistor 203 is configured to receive the reference voltage output by the drive circuit 202, and the source of the replenishment power transistor 203 is coupled to the power supply terminal of the drive circuit 202. In this way, according to a conduction characteristic of the replenishment power transistor 203, the replenishment power transistor 203 can conduct when a difference between the reference voltage and a voltage of the power supply terminal of the drive circuit 201 is greater than a voltage threshold (VTH). After the replenishment power transistor 203 conducts, the input terminal of the active clamp flyback circuit 201 is coupled to the power supply terminal of the drive circuit 202. In this way, the drive circuit 202 can be replenished with power by using the input terminal of the active clamp flyback circuit 201, to resolve a voltage drop problem of the drive circuit 202 in the conversion circuit 200.

The input terminal of the active clamp flyback circuit 201 is bridged with a clamp capacitor, and the first terminal of the replenishment power transistor 203 may be coupled to the clamp capacitor, to implement coupling between the first terminal of the replenishment power transistor 203 and the input terminal of the active clamp flyback circuit 201.

A structure of the active clamp flyback circuit 201 in this embodiment may be the same as that of an active clamp flyback circuit in an ACF circuit in the conventional technology. A structure of the ACF circuit in the conventional technology is also applicable to the active clamp flyback circuit 201 in this embodiment. The following describes an example of the structure of the active clamp flyback circuit 201.

Figure 3:
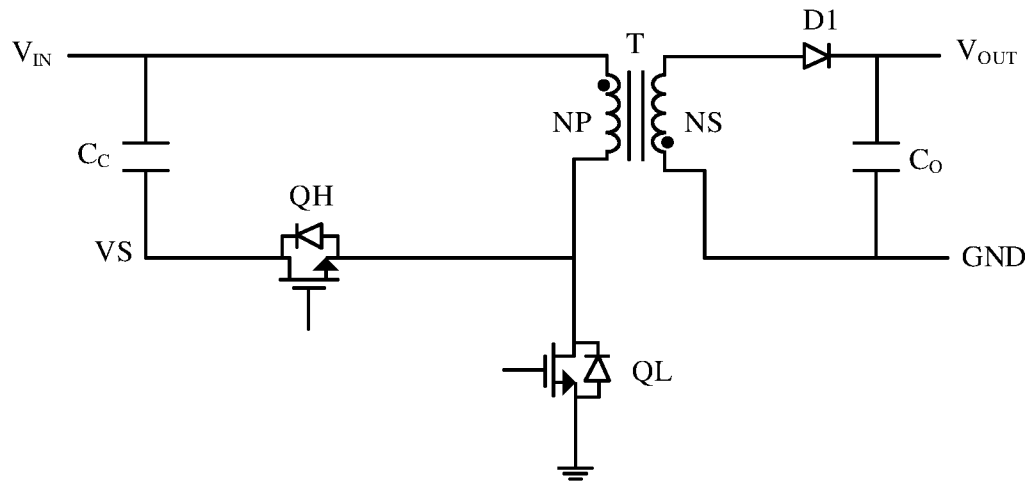
FIG. 3 is a schematic diagram of a structure of an active clamp flyback circuit according to an embodiment.

As shown in FIG. 3, the active clamp flyback circuit 201 includes a clamp capacitor Cc, a first power transistor QH, a second power transistor QL, a transformer T, an output diode D1, and a load capacitor Co. A drain of the first power transistor is coupled to the clamp capacitor, and a source of the first power transistor is coupled to a ground terminal of the drive circuit 202, a gate of the first power transistor is coupled to an output terminal of the drive circuit 202. A drain of the second power transistor is coupled to the source of the first power transistor, and a source of the second power transistor is coupled to a ground. The transformer includes a primary coil and a secondary coil, two terminals of the primary coil are respectively coupled to the clamp capacitor and the source of the first power transistor, and two terminals of the secondary coil are respectively connected to an anode of the output diode and the load capacitor. A cathode of the output diode is coupled to the load capacitor. Two terminals of the load capacitor are configured to output a direct current.

The first power transistor QH and the second power transistor QL may alternately conduct by being driven by the drive circuit 202, so that power conversion can be implemented. An operating principle of the active clamp flyback circuit 201 may be the conventional technology, and details are not described herein.

It should be noted that, in the active clamp flyback circuit 201, only the drive circuit of the first power transistor QH relates to a power replenishment problem, and the source of the second power transistor QL is grounded. Therefore, a drive circuit of the second power transistor QL relates to no power replenishment problem. Therefore, in this embodiment, only the drive circuit 202 of the first power transistor QH is discussed. In actual application, a drive circuit also needs to be configured for the second power transistor QL, to drive conduction and cutoff of the second power transistor QL (the drive circuit of the second power transistor QL is shown in none of the accompanying drawings in the embodiments).

In addition, both the drive circuit of the first power transistor QH and the drive circuit of the second power transistor QL can generate corresponding drive signals (drive voltages) based on control signals. In actual application, the control signal may be a pulse width modulation (PWM) signal. For example, a rising edge of the PWM signal is used to indicate a drive circuit to drive a power transistor to conduct, and a falling edge of the PWM signal is used to indicate the drive circuit to drive the power transistor to be cut off.

Figure 4:
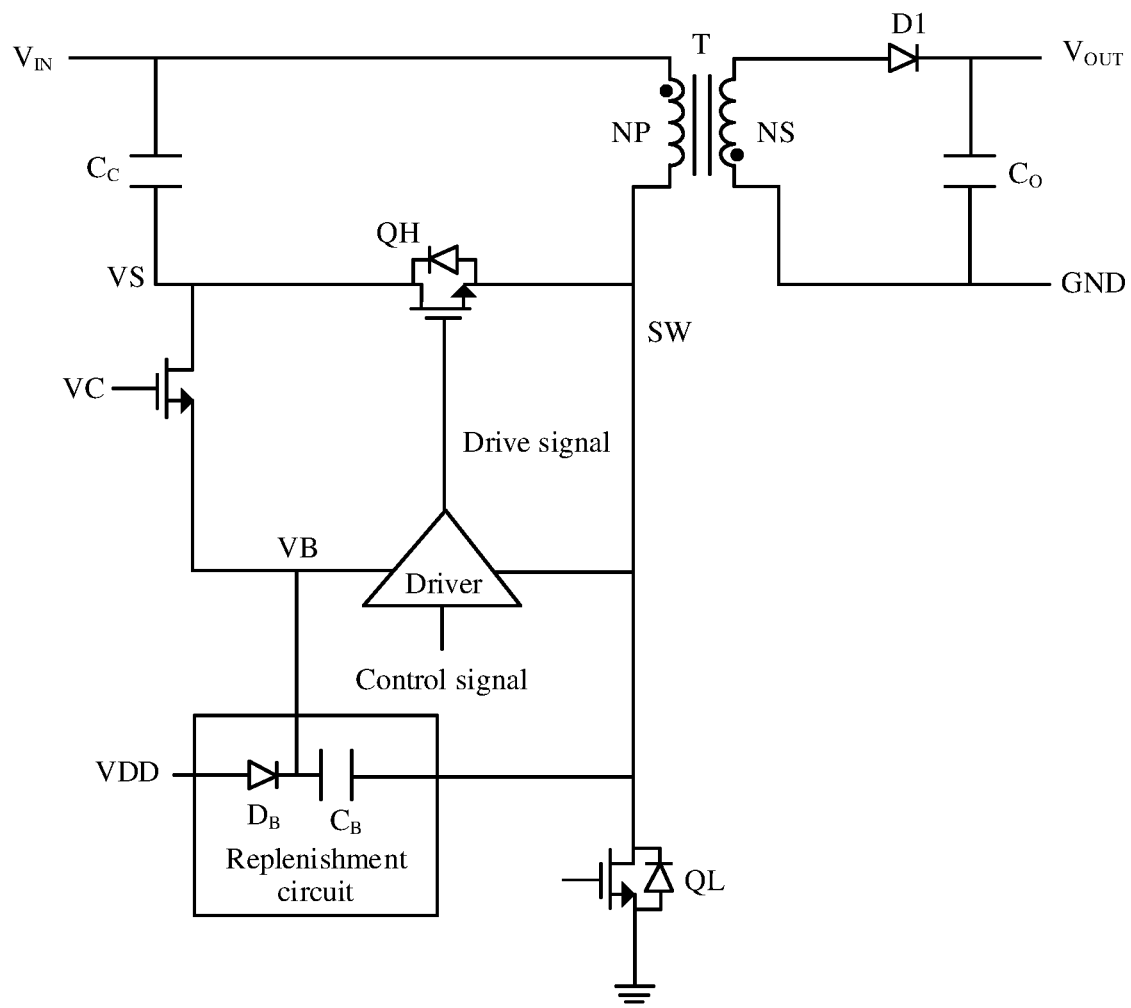
FIG. 4 is a schematic diagram of a structure of a second conversion circuit according to an embodiment.

In this embodiment, the drive circuit 202 configured to drive the first power transistor QH may include a driver and a replenishment circuit. As shown in FIG. 4, the driver is configured to generate the drive signal based on an input control signal, where the drive signal is used to drive the first power transistor QH to conduct be or cut off. A power supply terminal of the driver is coupled to the source of the replenishment power transistor 203 (represented by using VC in FIG. 4), and a ground terminal of the driver is coupled to the source of the first power transistor QH. The replenishment circuit includes a diode $D_B$ and a bootstrap capacitor $C_B$, an anode of the diode $D_B$ is coupled to a replenishment power supply VDD, a cathode of the diode $D_B$ is coupled to a first terminal of the bootstrap capacitor $C_B$ and the power supply terminal VB of the drive circuit 202, and a second terminal of the bootstrap capacitor $C_B$ is coupled to the ground terminal of the driver.

It should be noted that, in the description of this embodiment, the power terminal of the driver is the power terminal of the drive circuit 202, and the ground terminal of the driver is the ground terminal of the drive circuit 202.

In the conversion circuit 200 shown in FIG. 4, when the second power transistor QL conducts, the bootstrap capacitor $C_B$ is charged by using the replenishment power supply VDD. In this case, the voltage of VB continuously rises, and the replenishment power transistor QS is in a cutoff state. When the second power transistor QL is cut off, a voltage of SW quickly rises with conversion of an operating state of the active clamp flyback circuit 201. In addition, with operating of the driver, an electric charge of the bootstrap capacitor $C_B$ is continuously consumed, and the voltage of VB continuously drops. Therefore, a voltage difference between VB and SW gradually decreases. When the voltage difference between VB and SW decreases to VC−VTH−SW (it is equivalent that the voltage of VB continuously drops until VC−VB=VTH, where VTH is a conduction voltage threshold of the replenishment power transistor QS), the replenishment power transistor QS conducts, and the bootstrap capacitor $C_B$ can be coupled to the clamp capacitor Cc by using the replenishment power transistor QS, to replenish the bootstrap capacitor $C_B$ with power, so that the voltage difference between VB and SW no longer decreases. Therefore, even if the second power transistor QL is in a cutoff state for long time, the voltage difference between VB and SW does not continuously decrease. When the drive circuit 202 needs to drive the first power transistor QH to conduct, VB–SW is not too low. Therefore, the driver can normally drive the first power transistor QH to conduct, to avoid an under-voltage problem of a driver in the conventional technology, thereby fundamentally resolving a problem that a voltage of a power supply of the driver drops when the second power transistor QL is cut off.

Figure 5:
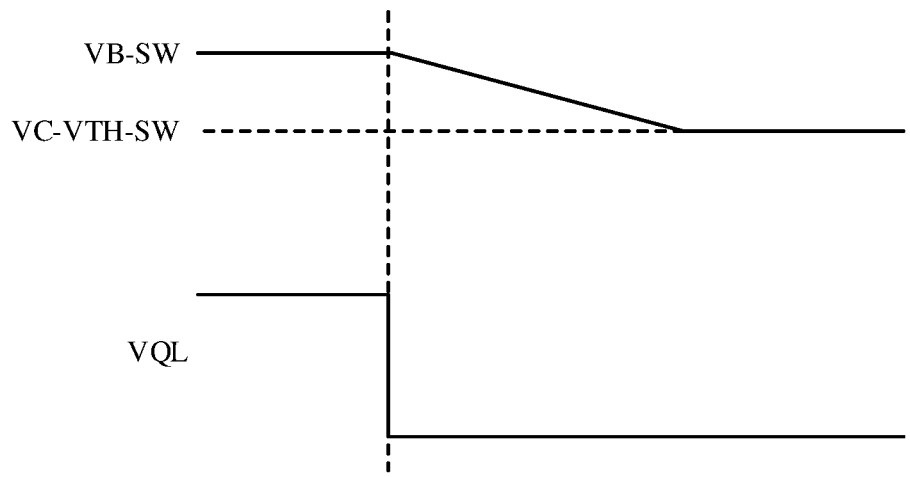
FIG. 5 is a schematic diagram of waveforms of voltages in a conversion circuit according to an embodiment.

FIG. 5 is a schematic diagram of waveforms that are of the voltage difference between VB and SW and a control signal VQL of the drive circuit of the second power transistor QL and that are obtained when the conversion circuit 200 shown in FIG. 4 is used. It can be understood from FIG. 5 that, when VQL is on a falling edge, the drive circuit of the second power transistor QL controls, according to the control signal VQL, the second power transistor QL to be cut off. With the cutoff the second power transistor QL, VB–SW continuously decreases until VC–VTH–SW, and the replenishment power transistor QS conducts to replenish the bootstrap capacitor $C_B$ with power, so that VB–SW is kept at a normal electrical potential. In this way, when the drive circuit 202 needs to drive the first power transistor QH to conduct, VB–SW is not too low. Therefore, a voltage of the power supply of the driver does not drop.

In this embodiment, both the first power transistor and the second power transistor may be enhanced power transistors, for example, may be enhanced GaN transistors. The replenishment power transistor may be a depleted power transistor (for example, a depleted GaN transistor), or may be an enhanced power transistor (for example, an enhanced GaN transistor).

A difference between the enhanced power transistor and the depleted power transistor lies in that a conduction threshold voltage of the enhanced power transistor is a positive value, and a conduction threshold voltage of the depleted power transistor is a negative value. That is, for the depleted power transistor, the depleted power transistor can conduct only when a difference between a gate voltage and a source voltage reaches the negative threshold, that is, the gate voltage is less than the source voltage when the depleted power transistor conducts. For the enhanced power transistor, the enhanced power transistor can conduct only when a difference between a gate voltage and a source voltage reaches the positive threshold, that is, the gate voltage needs to be greater than the source voltage when the enhanced power transistor conducts.

As described above, the gate of the replenishment power transistor 203 is configured to receive the reference voltage output by the drive circuit 202, and the source of the replenishment power transistor 203 is coupled to the power supply terminal of the drive circuit 202.

If the replenishment power transistor 203 is a depleted power transistor, the replenishment power transistor 203 can conduct only when a voltage value of the reference voltage is less than a voltage value of the power supply terminal of the drive circuit 202. Therefore, the drive circuit 202 needs to output only a reference voltage less than a power supply voltage of the drive circuit 202. In this case, it is unnecessary to add a reference voltage generation module to the drive circuit 202, and it is only necessary to output a reference voltage from a node inside the drive circuit 202.

If the replenishment power transistor 203 is an enhanced power transistor, the replenishment power transistor 203 can conduct only when a voltage value of the reference voltage is greater than a voltage value of the power supply terminal of the drive circuit 202. Therefore, the drive circuit 202 needs to output a reference voltage greater than a power supply voltage of the drive circuit 202. In this case, a reference voltage generation module needs to be added to the drive circuit 202. For example, the drive circuit 202 may further include a charge pump (CP), and the CP is configured to generate the reference voltage. The CP is characterized as being capable of generating, when an input voltage is relatively low, an output voltage higher than the input voltage.

In addition, in this embodiment, the first power transistor and the replenishment power transistor 203 may be integrated on a same substrate. For example, the first power transistor and the replenishment power transistor 203 may be integrated on a same silicon substrate, to reduce a chip area.

In conclusion, the replenishment power transistor 203 is additionally disposed in the conversion circuit 200 provided in this embodiment. The gate of the replenishment power transistor 203 is configured to receive the reference voltage output by the drive circuit 202, and the source of the replenishment power transistor 203 is coupled to the power supply terminal of the drive circuit 202. In this way, according to the conduction characteristic of the replenishment power transistor 203, the replenishment power transistor 203 can conduct when the difference between the reference voltage and the voltage of the power supply terminal of the drive circuit 201 is greater than a voltage threshold, that is, the replenishment power transistor 203 can conduct after a voltage of the power supply of the drive circuit 202 drops. After the replenishment power transistor 203 conducts, the input terminal of the active clamp flyback circuit 201 is coupled to the power supply terminal of the drive circuit 202. In this way, the drive circuit 202 can be replenished with power by using the input terminal of the active clamp flyback circuit 201, to resolve a voltage drop problem of the drive circuit 202 in the conversion circuit 200.

The following describes the conversion circuit 200 provided in this embodiment by using two examples.

Embodiment 1

Figure 6:
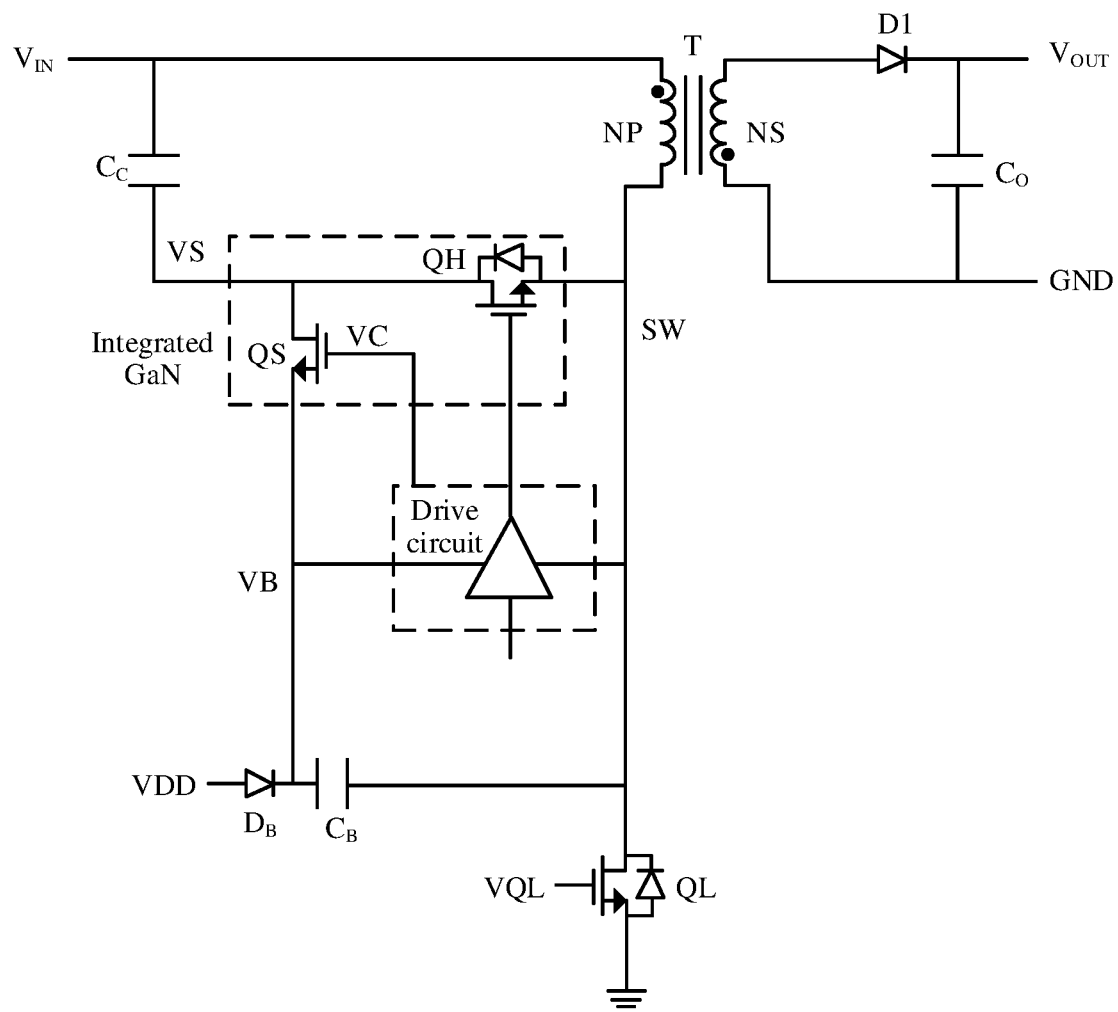
FIG. 6 is a schematic diagram of a structure of a third conversion circuit according to an embodiment.

A schematic diagram of a possible structure of the conversion circuit 200 provided in this embodiment may be shown in FIG. 6.

In the conversion circuit shown in FIG. 6, a depleted GaN transistor is used as the replenishment power transistor QS, an enhanced GaN transistor is used as the first power transistor QH, and the two transistors are integrated together. A reference voltage VC lower than VB is generated in the drive circuit and is input to the gate of the replenishment power transistor QS. After the second power transistor QL is cut off, a voltage of the bootstrap capacitor $C_B$ continuously drops. When the voltage of VB drops, the reference voltage VC–VB is greater than the threshold voltage of the replenishment power transistor QS. Therefore, the replenishment power transistor QS conducts, and a replenishment channel from VS to VB is formed, so that VS can charge the bootstrap capacitor $C_B$, to recover the voltage of VB, thereby resolving a voltage drop problem of the driver.

Embodiment 2

Figure 7:
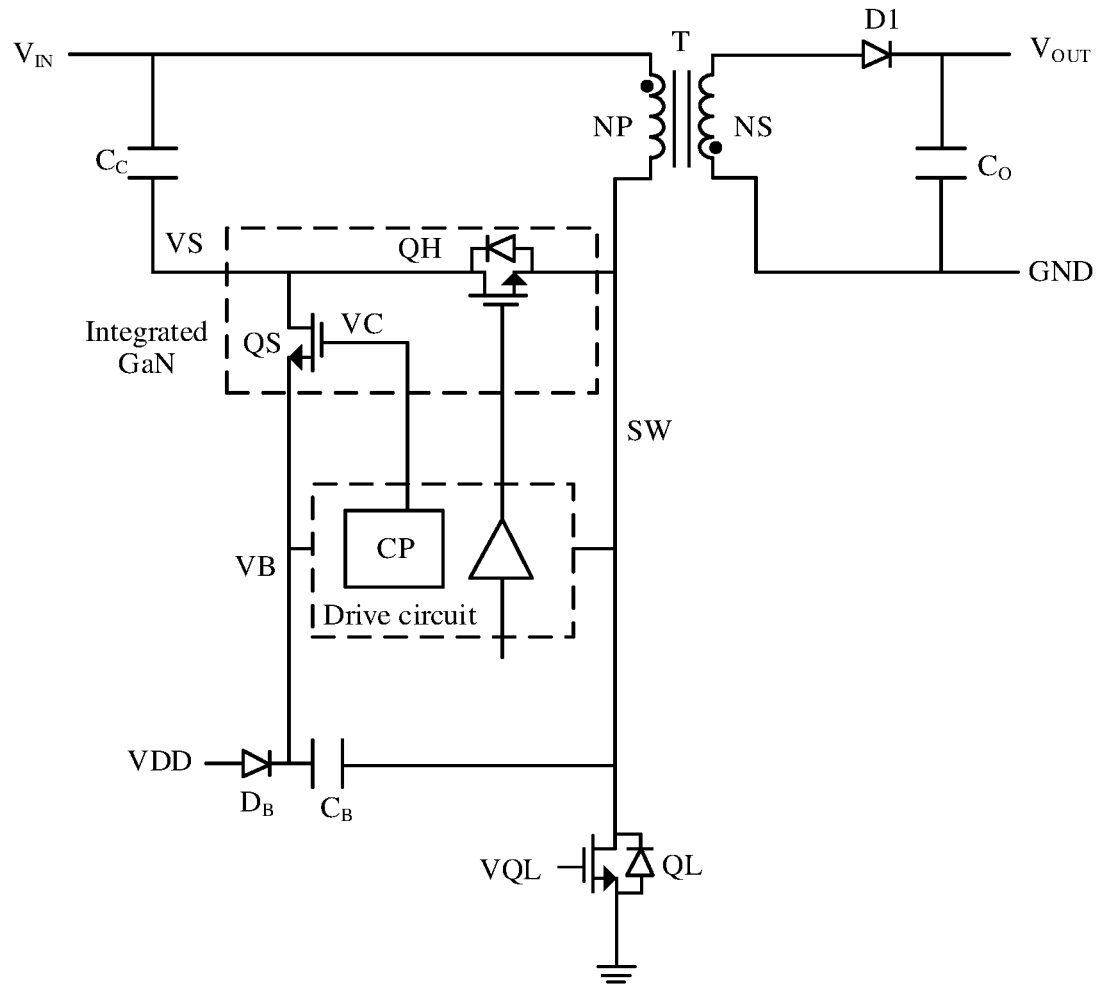
FIG. 7 is a schematic diagram of a structure of a fourth conversion circuit according to an embodiment.

A schematic diagram of a possible structure of the conversion circuit 200 provided in this embodiment may be shown in FIG. 7.

In the conversion circuit shown in FIG. 7, enhanced GaN transistors are used as the replenishment power transistor QS and the first power transistor QH, and the two transistors are integrated together. In the drive circuit, the CP is used to generate a voltage VC higher than VB, to control the replenishment power transistor QS. After the second power transistor QL is cut off, a voltage of the bootstrap capacitor $C_B$ continuously drops. When the voltage of VB drops to, the reference voltage VC–VB is greater than the threshold voltage of the replenishment power transistor QS. Therefore, the replenishment power transistor QS conducts and a replenishment channel from VS to VB forms, so that VS can charge the bootstrap capacitor $C_B$, to recover the voltage of VB, thereby resolving a voltage drop problem of the driver.

Figure 8:
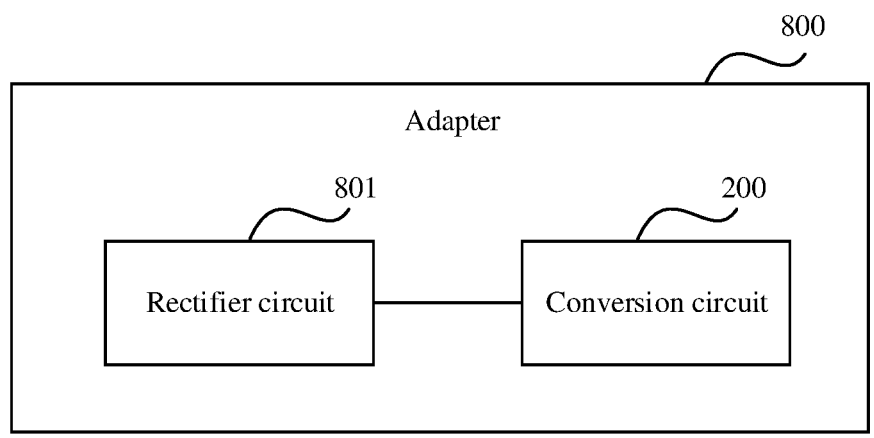
FIG. 8 is a schematic diagram of a structure of an adapter according to an embodiment.

Based on a similar concept, an embodiment may further provide an adapter. As shown in FIG. 8, the adapter 800 includes a rectifier circuit 801 and a conversion circuit 200. The rectifier circuit 801 is configured to rectify an input alternating current, to obtain an output current. The conversion circuit 200 is configured to convert the output current of the rectifier circuit 801 into a direct current.

It should be noted that for implementations not described in detail in the adapter 800, refer to related descriptions in the conversion circuit 200. Details are not described herein again.

It is clear that a person skilled in the art can make various modifications and variations without departing from the scope of the embodiments and their equivalent technologies.

What is claimed is:

1. A conversion circuit, comprising:
    an active clamp flyback circuit; configured to perform power conversion;
    a drive circuit configured to output a drive signal and a reference voltage, wherein the drive signal is used to drive the active clamp flyback circuit; and
    a replenishment power transistor, wherein a first terminal of the replenishment power transistor is coupled to an input terminal of the active clamp flyback circuit, a second terminal of the replenishment power transistor is coupled to a power supply terminal of the drive circuit, and a gate of the replenishment power transistor is configured to receive the reference voltage.

2. The conversion circuit according to claim 1, wherein the input terminal of the active clamp flyback circuit is bridged with a clamp capacitor, the first terminal of the replenishment power transistor is coupled to the clamp capacitor, and the replenishment power transistor conducts when a difference between the reference voltage and a voltage of the power supply terminal of the drive circuit is greater than a voltage threshold.

3. The conversion circuit according to claim 1, wherein the drive circuit further comprises:
    a driver, configured to generate the drive signal based on an input control signal, wherein the drive signal is used to drive a first power transistor in the active clamp flyback circuit to be conducted or be cut off, a power supply terminal of the driver is coupled to the second terminal of the replenishment power transistor, and a ground terminal of the driver is coupled to a source of the first power transistor; and
    a replenishment circuit comprising a diode and a bootstrap capacitor, wherein an anode of the diode is coupled to a replenishment power supply, a cathode of the diode is coupled to a first terminal of the bootstrap capacitor and the power supply terminal of the drive circuit, and a second terminal of the bootstrap capacitor is coupled to the ground terminal of the driver.

4. The conversion circuit according to claim 3, wherein the first power transistor is an enhanced power transistor, and the first power transistor and the replenishment power transistor are integrated on a same substrate.

5. The conversion circuit according to claim 1, wherein the replenishment power transistor is a depleted power transistor, and a voltage value of the reference voltage is less than a voltage value of the power supply terminal of the drive circuit.

6. The conversion circuit according to claim 1, wherein the replenishment power transistor is an enhanced power transistor, and a voltage value of the reference voltage is greater than a voltage value of the power supply terminal of the drive circuit.

7. The conversion circuit according to claim 6, wherein the drive circuit further comprises:
    a charge pump configured to generate the reference voltage.

8. The conversion circuit according to claim 1, wherein the active clamp flyback circuit further comprises:
    a clamp capacitor;
    a first power transistor, wherein a drain of the first power transistor is coupled to the clamp capacitor, the source of the first power transistor is coupled to a ground terminal of the drive circuit, and a gate of the first power transistor is coupled to an output terminal of the drive circuit;
    a second power transistor, wherein a drain of the second power transistor is coupled to the source of the first power transistor, and a source of the second power transistor is coupled to a ground;
    a transformer, wherein the transformer comprises a primary coil and a secondary coil, two terminals of the primary coil are respectively coupled to the clamp capacitor and the source of the first power transistor, and two terminals of the secondary coil are respectively connected to an anode of an output diode and a load capacitor;
    the output diode, wherein a cathode of the output diode is coupled to the load capacitor; and
    the load capacitor, wherein two terminals of the load capacitor are configured to output a direct current.

9. The conversion circuit according to claim 1, wherein the first terminal of the replenishment power transistor is configured to be a drain of the replenishment power transistor, and the second terminal of the replenishment power transistor is configured to be a source of the replenishment power transistor.

10. An adapter, comprising a rectifier circuit and the conversion circuit according to claim 1, wherein the rectifier circuit is configured to rectify an input alternating current, to obtain an output current, and the conversion circuit is configured to convert the output current into a direct current.

* * * * *